(12) United States Patent
Godinez

(10) Patent No.: US 10,092,884 B2
(45) Date of Patent: Oct. 9, 2018

(54) WATER DISPERSING SYSTEM

(71) Applicant: Miguel A. Godinez, Oxnard, CA (US)

(72) Inventor: Miguel A. Godinez, Oxnard, CA (US)

( * ) Notice: Subject to any disclaimer, the term of this patent is extended or adjusted under 35 U.S.C. 154(b) by 109 days.

(21) Appl. No.: 15/141,256

(22) Filed: Apr. 28, 2016

(65) Prior Publication Data

US 2017/0312704 A1 Nov. 2, 2017

(51) Int. Cl.
*B01F 3/04* (2006.01)
*B05B 3/10* (2006.01)
*B05B 7/00* (2006.01)
*B05B 7/16* (2006.01)
*B05B 3/00* (2006.01)
*F28C 3/06* (2006.01)
*F04D 19/00* (2006.01)
*F04D 25/08* (2006.01)
*F04D 27/00* (2006.01)
*F04D 29/32* (2006.01)
*F04D 29/38* (2006.01)

(52) U.S. Cl.
CPC ...... *B01F 3/04035* (2013.01); *B01F 3/04021* (2013.01); *B05B 3/001* (2013.01); *B05B 3/105* (2013.01); *B05B 7/0081* (2013.01); *B05B 7/1606* (2013.01); *F04D 19/002* (2013.01); *F04D 25/08* (2013.01); *F04D 27/004* (2013.01); *F04D 29/325* (2013.01); *F04D 29/38* (2013.01); *F28C 3/06* (2013.01)

(58) Field of Classification Search
CPC .... B01F 3/04; B01F 3/04007; B01F 3/04021; B01F 3/04049

USPC .................................. 261/30, 115, 116, 117
See application file for complete search history.

(56) References Cited

U.S. PATENT DOCUMENTS

| 5,823,617 | A  | 10/1998 | Schafer       |
|-----------|----|---------|---------------|
| 6,581,855 | B1 | 6/2003  | Cook          |
| 6,592,049 | B1 | 7/2003  | Wolput        |
| 8,205,806 | B2 | 6/2012  | Mak et al.    |
| 8,529,078 | B2 | 9/2013  | Lee           |
| 2013/0098079 | A1 | 6/2013 | Apolony et al. |

FOREIGN PATENT DOCUMENTS

JP        06254297 A  *  9/1994

* cited by examiner

*Primary Examiner* — Robert A Hopkins

(57) ABSTRACT

A water dispersing system (WDS) that allows a selectable quantity of water to be dispersed into an environment. The WDS utilizes a fan and a water supply assembly. The fan has a frame inside of which are two rotating blades, and preferably a stand. The water supply assembly includes a reservoir, a water tube, and a water dispersing head. Water is gravity fed from the reservoir, through the water tube and out of the head. Water from the head is directed into the first fan's rotating blades. Once the water hits the blades, the water is re-directed back out through a front grill on the fan. The second fan blades project air outward. The amount of water that comes from the WDS can be selectably chosen, from a light mist to a heavier spray, and the temperature of the water can be lowered by placing ice into the reservoir with the water. An excess water basin catches any water that drips downward from the blades.

15 Claims, 9 Drawing Sheets

WATER DISPERSING SYSTEM

TECHNICAL FIELD

The invention generally pertains to water dispersing or misting devices, and more particularly to a water dispersing system that allows a selectable quantity of water to be sprayed into an environment from a self-contained comparatively small assembly.

BACKGROUND ART

Many people throughout the world live in areas/locations that have less than optimal weather. Some of the areas/locations have weather that results in overly warm conditions, while other areas/locations are extremely cold. Most areas/locations vary and experience both, depending on the time of the year.

In many first world countries, climate control systems including air conditioning are utilized. In other countries people rely on heaters when it is cold, and fans when it is warm. There are various types and sizes of fans, but essentially all types function in the same basic manner. An enclosure has blades that are typically powered by a motor. The blades rotate, forcing air in whatever direction the fan is placed. Fans are usually effective and do not require any skill to operate.

For certain outdoor events in warm weather, a water misting system is utilized. A water misting system typically consists of a large frame approximately 7-10 feet high and 6-30 feet long that is hooked up to a water supply. Along the length of the frame are multiple water outlets. The water outlets are designed so that each one outputs a small amount of water, which is usually in a mist form. As a person walks by or otherwise comes near the system, he/she feels the water mist. These water misting systems are very effective and people tend to appreciate the use of a water misting system at warm outdoor events.

Unfortunately, due to the size of most water misting systems, they are only practical for use in somewhat large areas. It would be very beneficial to produce/provide a self-contained water dispersing system that could be used indoors or outdoors. Optimally, a conventional fan could be modified to produce a selectable quantity of water that is dispersed as a light mist or a heavier spray.

A search of the prior art did not disclose any literature or patents that read directly on the claims of the instant invention. However, the following U.S. patents are considered related:

| Pat. No. | INVENTOR | ISSUED |
| --- | --- | --- |
| 6,592,049 | Wolput | 15 Jul. 2003 |
| 8,205,806 | Mak et al | 26 Jun. 2012 |
| 2013/0098079 | Apolony et al | Pub. Date 25 Jun. 2013 |

The U.S. Pat. No. 6,592,049 discloses a water misting device having a hook and loop fastener connected to a nozzle mounting assembly. The nozzle mounting assembly has attached an inlet tube bore, a connected nozzle bore and a misting nozzle. An electrically driven water pump is connected to a water inlet tube. A timer is electrically connected to the water inlet tube. A timer is electrically connected to the water pump for selectively powering the water pump to intermittently force the flow of water through the water pump.

The U.S. Pat. No. 8,205,806 discloses a misting fan which includes a rotatable fan blade collar, a plurality of fan blades mounted around the rotatable fan blade collar, a mist-generating assembly, a drive mechanism and a motor. The mist-generating assembly includes a mist nozzle disposed inside the fan blade collar and a hose with one end being coupled to the nozzle. The motor includes a motor shaft for rotating the fan blade collar through the drive mechanism.

The 2013/0098079 publication discloses a mist cooling assembly comprising a housing, a plurality of water misting outlets generally aligned in a row along the housing, the misting outlets are spaced along a misting width, and at least one air flow source is disposed within the housing for supplying an air flow. The housing comprises at least one air flow outlet adapted to direct the air flow in use adjacent the misting outlets and substantially spanning the misting width.

For background purposes and indicative of the art to which the invention relates, reference may be made to the following remaining patents found in the patent search.

| Pat. No. | INVENTOR | ISSUED |
| --- | --- | --- |
| 5,823,617 | Schafer | 20 Oct. 1998 |
| 6,581,855 | Cook | 24 Jun. 2003 |
| 8,529,078 | Lee | 10 Sep. 2013 |

DISCLOSURE OF THE INVENTION

In its basic design, the water dispersing system is comprised of a fan and a water supply assembly. The fan can be any type including table-top or floor standing, and basically consists of a frame inside of which are rotating blades that force air outward from the fan. The water supply assembly includes a reservoir in which water is maintained, a water tube coming from the reservoir, and a water dispersing head attached to the water tube. The reservoir is placed on a reservoir support located adjacent the rear of the fan. The dispersing head is attached to a front grill on the fan, with the head directed inward toward the fan blades. Water is gravity fed from the reservoir through the water tube. From the tube, the water exits through the valve, passing through a brush that regulates and separates the water flow to a necessary size. The water is directed onto the rotating fan blades, and is forced by the blades back out through the fan's front grill into the environment. The amount of water can be selectably chosen, from a light mist to a heavier spray by means of a blade rotating speed control knob, and a control knob on the spray head valve.

If desired, ice can be added to the water within the reservoir to produce a mist or spray of cold water. Located below the fan is an excess water basin to catch and maintain any water that drips downward from the blades.

In view of the above disclosure, the primary object of the invention is to provide a water dispersing system that allows a selectable quantity of water to be directed outward from the system into the environment.

In addition to the primary object, it is also an object of the invention to provide a water dispersing system that:

is easy to use,
is portable,
direct water over a large or small area,
can be used for extended periods of time with a minimal amount of supplied water,
can be made in various sizes,
can be used indoors or outdoors, does not damage the fan, which can be used to blow air only if desired, can be sold as a kit for a person to attach onto an existing fan, will not damage or affect any items in the vicinity, and is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
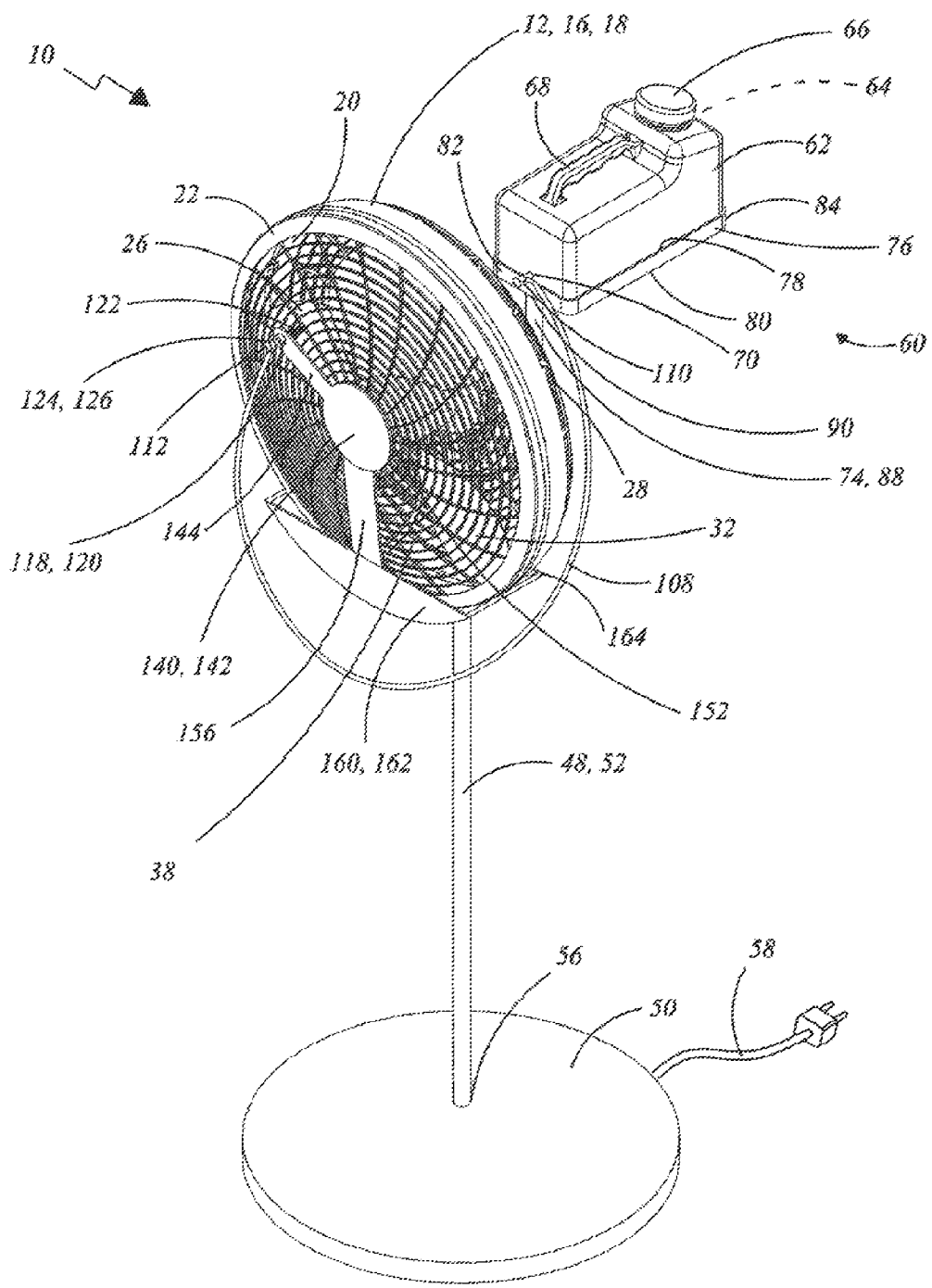
FIG. 1 is a front orthographic view of a water dispersing system (WDS).

The best mode for carrying out the invention is presented in terms that disclose a preferred embodiment of a water dispersing system. There are numerous methods of providing a cooling sensation on a hot day or in a hot environment. One of the most widely used devices is a fan which directs air in a specific direction or directions. Another method is a water misting or dispersing system, which typically lightly sprays water over a selected area. These systems are substantially larger than most conventional fans, and are commonly used at outdoor events in warm climates, where there is enough space to erect the system.

The WDS combines the functionality of a water dispersing or misting system with reduced size. As previously disclosed, the fan 12 can be a table-top type or a floor-standing type, with convenience of conventional table-top or floor-standing fans. The WDS, as shown in FIGS. 1-9, is comprised of the following major elements: a fan 12 and a water supply assembly, with the only difference being the type of stand each type utilizes. For the purpose of this disclosure, a floor-standing fan will be described in the text and shown in the drawings.

The fan 12, as shown in FIGS. 1-6, is comprised of a frame 16 having an outer surface 18, an inner surface 20, a front perimeter edge 22, a rear perimeter edge 24, a front grill 26 and a rear grill 28. Located within the frame 16 between the front grill 26 and the rear grill 28 are two sets of blades, first blades 32 and second blades 38, which are each connected via a shaft 36 to a motor 34. The blades 32,38 rotate at selectable speeds powered by the motor 34. The first blades 32 disperse water outward, and the second blades 38 disperse air. A power switch 42 is used to turn the fan 12 on and off, and a control knob 44 allows a person to selectably control the speed that the blades 32,38 rotate.

Extending downward from the fan 12 is a stand 48, shown in FIGS. 1-4. The stand 48 has a base 50, a vertical tube 52 with an upper end 54 and a lower end 56, and a power cord 58 that is plugged into a main power outlet. The lower end 56 of the tube 52 is connected to, and extends upward from the substantial center of, the base 50. The base 50 is shown as a circular structure, but any geometric shape can be utilized.

Figure 2:
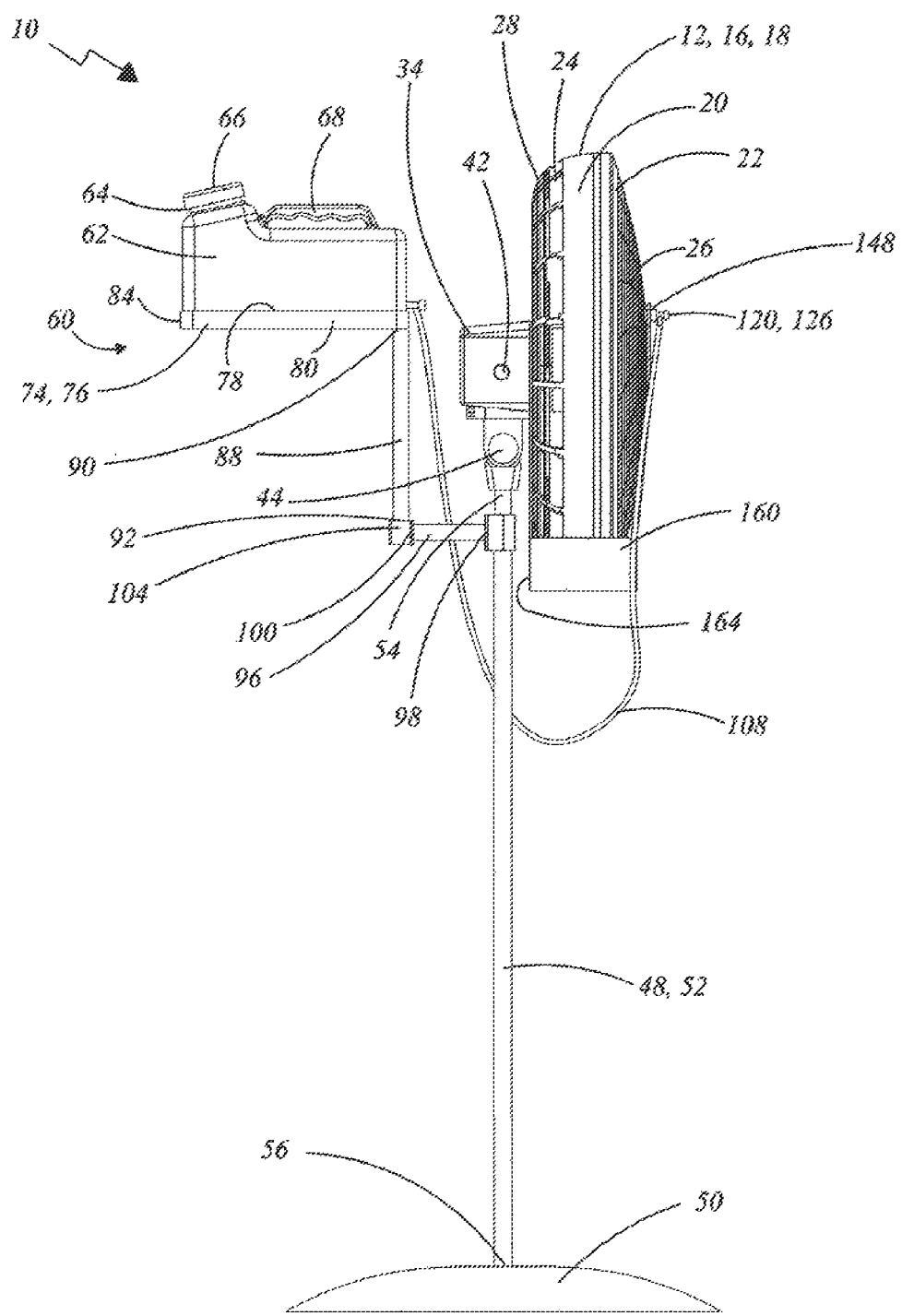
FIG. 2 is a right side elevational view of the WDS, the left side is a mirror image thereof.
Figure 5:
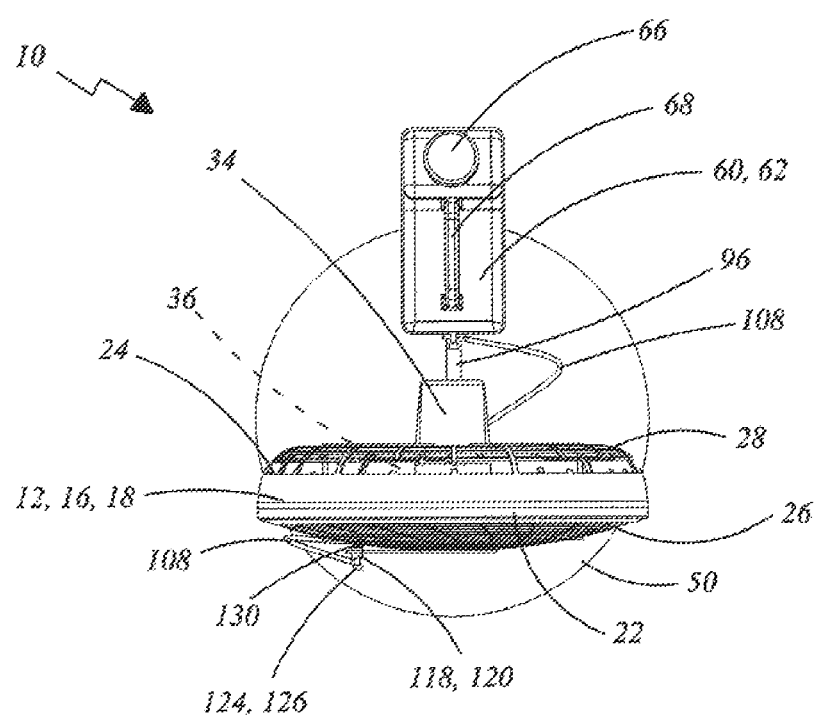
FIG. 5 is a top plan view of the WDS.
Figure 6:
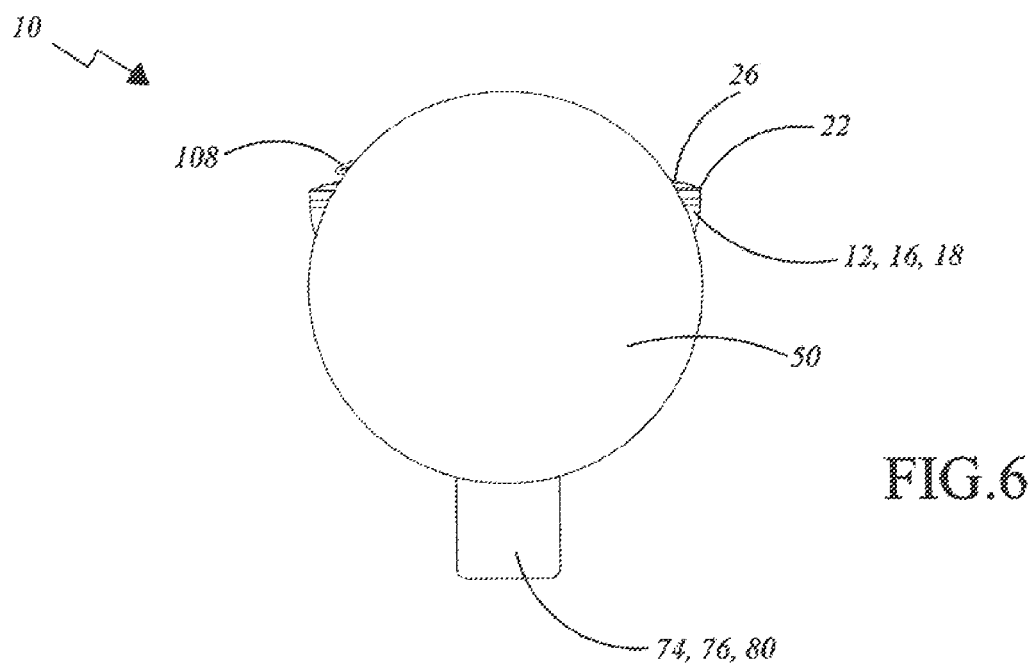
FIG. 6 is a bottom plan view of the WDS.
Figure 7:
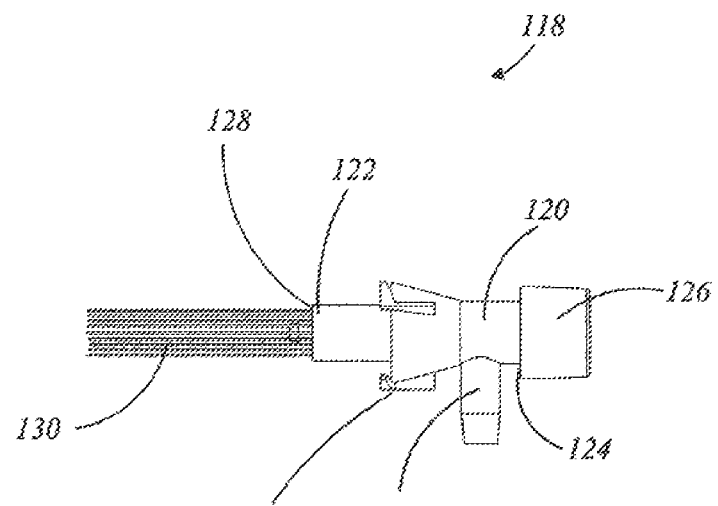
FIG. 7 is a side elevational view of a water dispersing head with a partial-turn connector as a connection first interface No. 1.

The water supply assembly 60, as shown in FIGS. 1-5, is comprised of a reservoir 62 having an opening 64 with a cap 66, and a water outlet 68. The reservoir is shown as a substantially rectangular, box-like structure, but any shaped structure that is capable of securely maintaining a quantity of water can be utilized. Additionally, the reservoir 62 can have a handle 68, as shown in FIGS. 1, 2 and 5. The reservoir 62 is placed upon a reservoir support 74 which has a platform 76 with an upper surface 78, a lower surface 80, a front edge 82, and a rear edge 84. Extending downward from the lower surface 78 of the platform 76 is a vertical member 88 having an upper end 90 and a lower end 92. Extending from the vertical member 88 is a horizontal member 96 having a front end 98 and a rear end 100. Attachment means 104 are utilized for attaching the platform 76 to the vertical member 88. The vertical member 88 to the horizontal member 96 and the horizontal member 96 to the vertical tube 52 on the stand 48. As best shown in FIG. 2, the reservoir support 74 is in modified squared-off Z-shape. The attachment means 104 preferably comprises a structure having openings into which the members are press-fit into.

Figure 8:
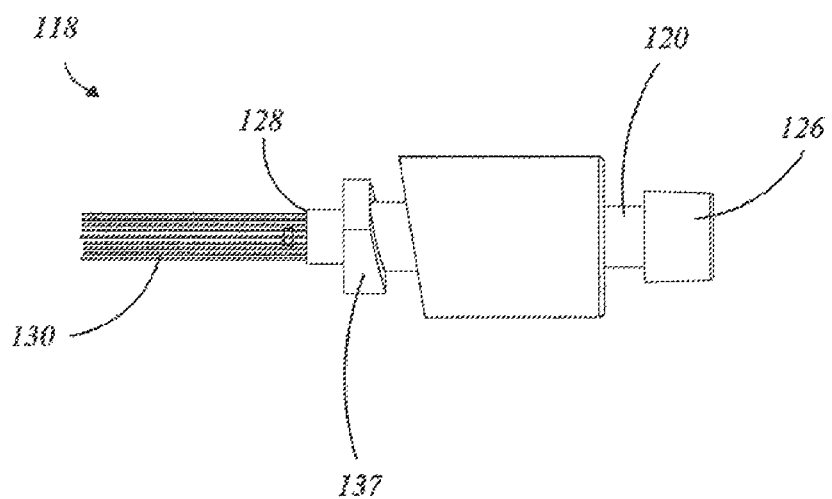
FIG. 8 is a side elevational view of a water dispersing head with a friction bore as a connection first interface No. 2.
Figure 9:
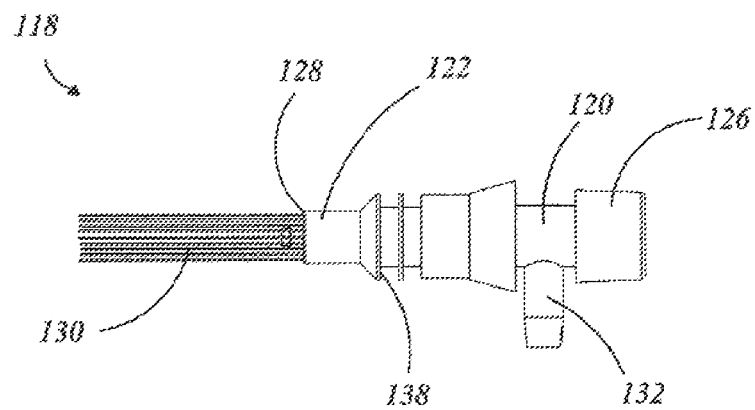
FIG. 9 is a side elevational view of a water dispersing head with a friction bore as a connection first interface No. 3.
Figure 10:
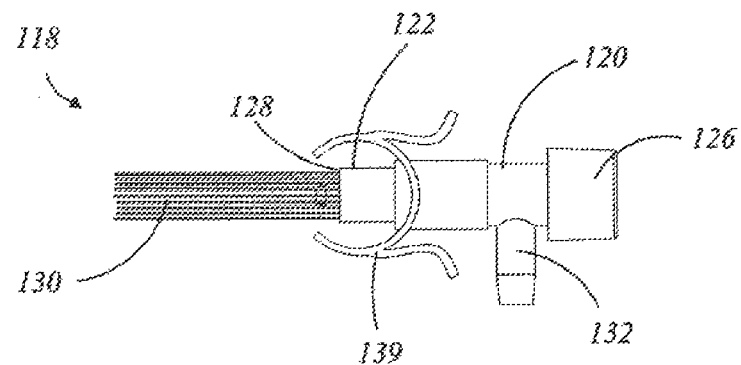
FIG. 10 is a side elevational view of a water dispersing head with a friction bore as a connection first interface No. 4
Figure 11:
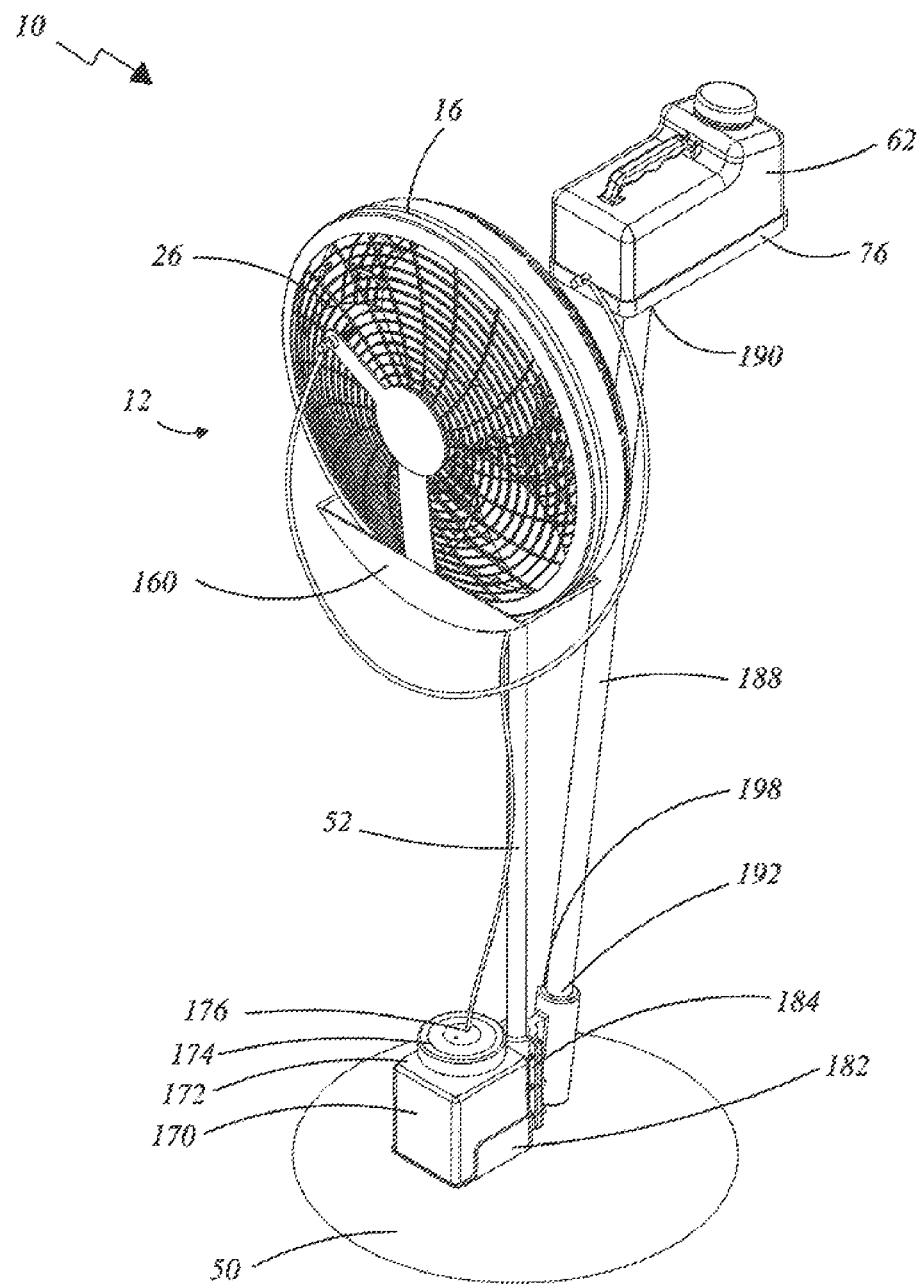
FIG. 11 is an orthographic view if the WDS showing an excess water container with an attached water tube, and a reservoir support rod.
Figure 12:
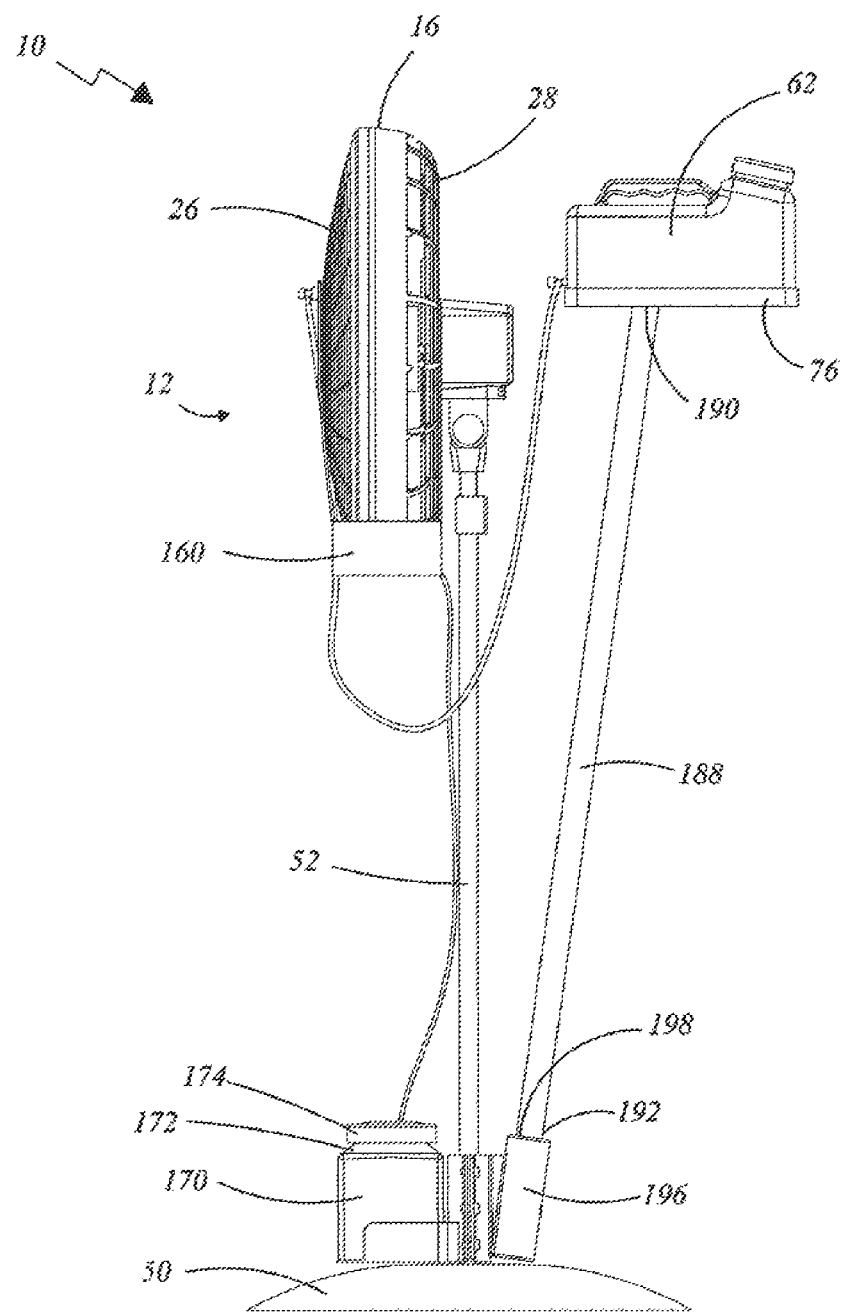
FIG. 12 is a left side view of the WDS showing the excess water container, water tube and the reservoir support rod.

Extending outward and downward from the reservoir's water outlet 70 is a water tube 108, as shown in FIGS. 1-5. The water tube 108 has a first end 110 that is connected to the water outlet 70, and a second end 112 that is connected to a water dispersing head 118. The water tube 108 facilitates the travel of water from the reservoir 62 to the head 118, which is comprised of a valve 120 with a first end 122 and a second end 124, a control knob 126 for continuing the amount of water that passes through the valve 120, an opening 128 into which is inserted a brush 130, and a tube insertion member 132. In order to regulate and properly direct the water from the head 118 into the fan 12 and onto the blades 32, the brush 130 is used. As the water passes through the brush 130, the bristles on the brush 130 separate the water into multiple "sections", which then hit the rotating fan blades. To secure the head 118 to the tube 108, the insertion member 132 is press-fit into an opening on the second end 112 of the tube. Also on the head 118 is a connection first interface No. 1, which is a partial turn connector 136. Other types of water dispersing head connection first interfaces 136 can be utilized, which include a friction bore 137 as connection first interface Nos. 2, as shown in FIG. 8; a press-lock 138 as connection first interface No. 3, as shown in FIG. 9; and a finger activated spring clip 139 as connection interface No. 4, a shown in FIG. 10. Any of these connection interfaces, as well as additional designs, can be used with equal efficacy to connect the water dispensing head 118 to the dispensing head attachment structure 140.

Figure 3:
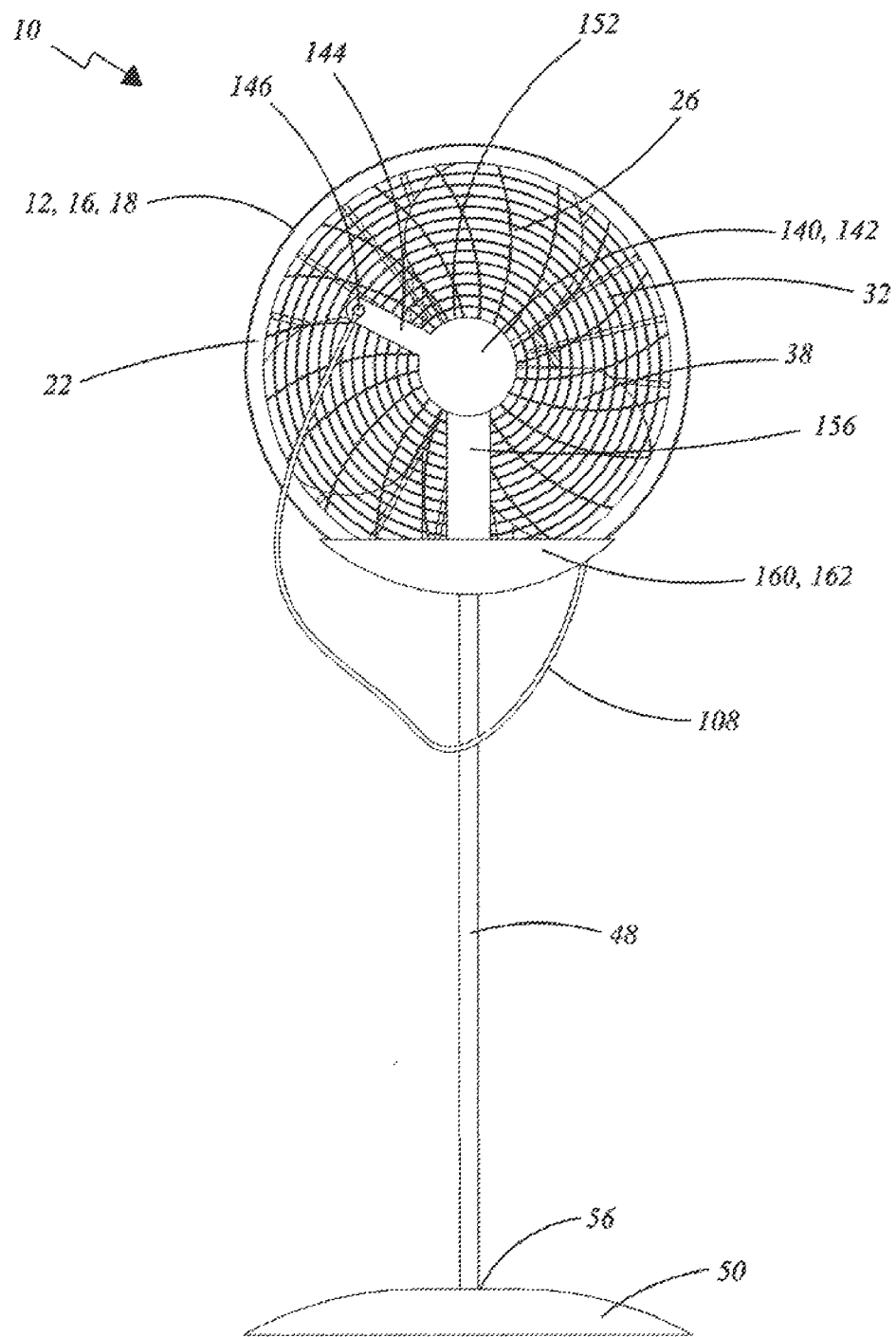
FIG. 3 is a front elevational view of the WDS.
Figure 4:
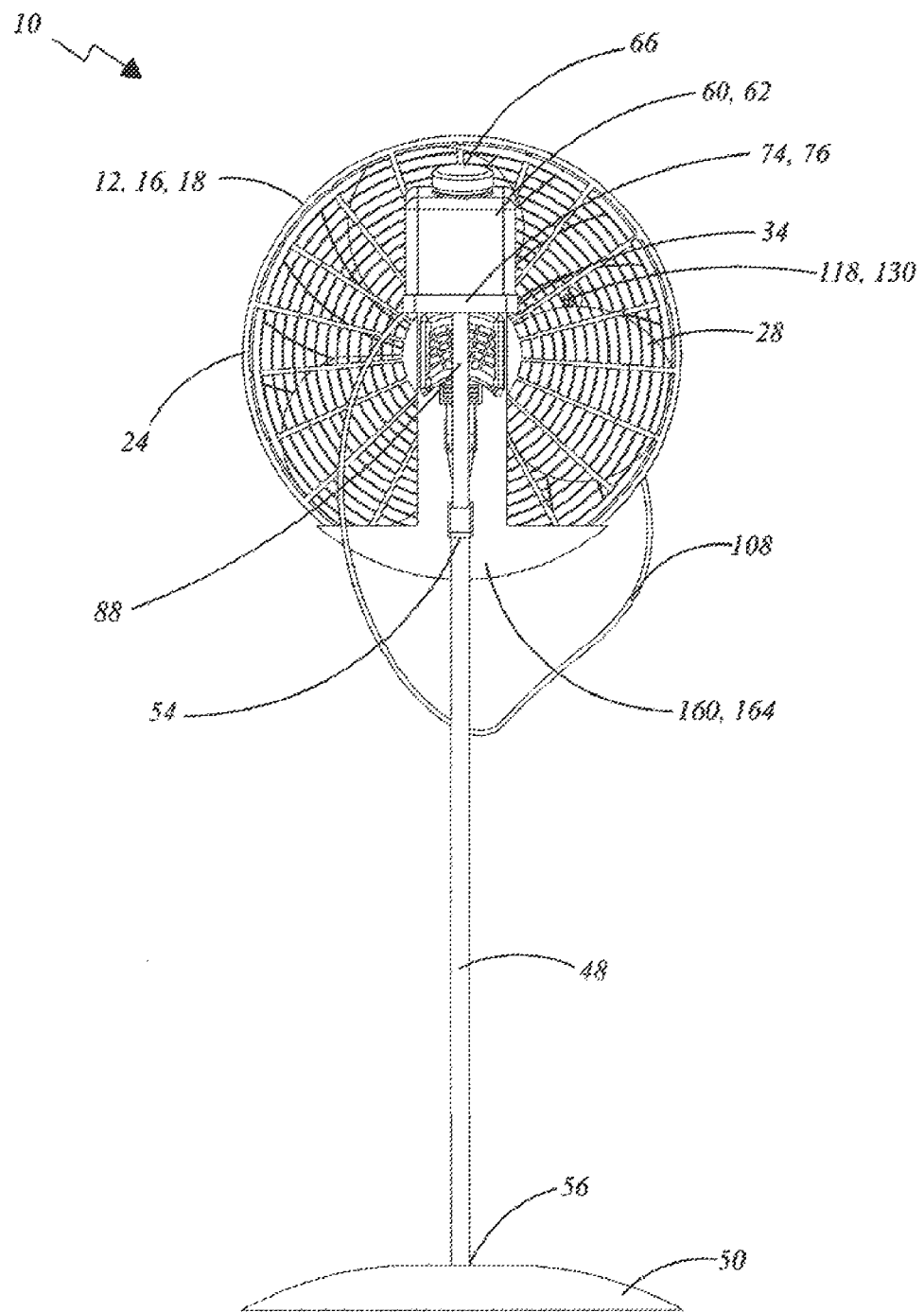
FIG. 4 is a rear elevational view of the WDS.

Attached by an attachment means 152, such as a clip, to the front grill 26 of the fan 12 is a dispersing head attachment structure 140. As shown in FIGS. 1 and 3, the attachment structure 140 has a center section 142 from where extends an upward-angled upper arm 144 having an opening 146 and a connection second interface 148. Extending downward from the center section is a vertical arm 156. The connection first interface 136 mates with the connection second interface 148 to connect the water dispersing head 118 to the attachment structure 140. Once the head 118 is connected to the structure 140, water can flow from the reservoir 62, through the water tube 108, and out of the head 118 onto the fan blades 32.

An excess water basin 160 having a front surface 162 and a rear surface 164 is located below the fan 12, with a lower section of the fan 12 placed within a cradle opening between the basin's front surface 162 and rear surface 164. As shown in FIGS. 1 and 3, the vertical arm 156 of the attachment structure 140 extends upward from the front surface 162 of the basin 160 and a rear section 166 extends upward from the rear surface 164. The vertical arm 156 and rear section 166 maintain the basin 160 securely in position below the fan 12.

During use, water from the reservoir 62 is gravity fed through the water tube 108 and exits from the water dispersing head 118. The water from the head 118 passes through the valve 120 and brush 130, which regulates the amount of water and directs the water onto the blades 32. Once the water hits the blades 32, the water is re-directed back out through the front grill 26 of the fan 12, into the environment.

The fan 12 is made of plastic or metal, with the metal preferably painted to avoid rust. The fan 12 can either be a single directional type, or the fan can oscillate from right to left, and left to right, thereby spraying water across a larger area. The amount of water from the WDS can vary from a light mist to a heavier spray.

To increase the functionally and to improve the ease of use of the WDS 10, an excess water container 170, as shown in FIGS. 8 and 9, can be added. The excess water container 170 has an upper surface 172 with a cap 174 having an opening 176 therethrough. The excess water container 170 is located on the base 50 and is maintained in position on the base 50 by a container securement structure 182 that is attached to the fan's frame vertical tube 52 by a frame tube interface 184. A water tube 178 extends from a lower surface of the excess water basin 160 to the excess water container 170 where the tube is inserted through the opening 176 in the container's cap 174. The excess water container 170 accepts water from the excess water basin 160, thereby providing a container that collects excess water from the basin, aiding that the basin does not overflow. The excess water container 170 also provides a quicker and easier method of emptying excess water from the WDS 10. A person simply pulls the tube out, lifts the excess water container 170 from the container securement structured 182. Removes the cap 174 and then pours the water from the container 170. This method is much better than removing water directly from the excess water basin 160 which is connected to the fan 12.

Additionally, in an alternate design, the WDS 10 can utilize a reservoir support rod 188 with an upper end and a lower end. As shown in FIGS. 8 and 9, the rod 188 extends upward from the base 50 to the reservoir platform 76. The rod 188 is maintained in a vertical position by inserting the rod's lower end 192 into an opening 198 on a rod attachment sleeve 196 that extends from the base 50 and is secured to the fan's frame vertical tube 52. The attachment sleeve 196 is angled to allow the support rod 188 to extend upward and terminate at the substantial center of the platform 76. The rod 188 is attached to the platform 76 by attachment means that can include an adhesive, at least one screw, or a nut and bolt combination, or the rod 188 can be integrally attached to the platform 76 by molding during manufacture. The support rod 188 offers an alternate means of supporting the reservoir 62.

If desired, the water from the WDS can be significantly cooled by adding ice to the water in the reservoir. For extended durations, dry ice can be used, but the cap on the reservoir must be removed to forego the build-up of dangerous pressure. Also, if desired, a fragrance (not shown) can be added to the water. As the water is dispersed into the environment, the fragrance is also dispersed. This can be especially effective for aromatherapy, as well as to simply create a pleasant smelling environment by a quick and easy method.

It should be noted that while a circular, floor-stranding fan has been described and shown, any type of fan, such as a square box fan can be utilized, as long as the fan has a front grill and rotating blades. Additionally, the WDS 10 can be sold as a kit that a person can attach to their own fan.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A water dispersing system (WDS) that allows a selectable quantity of water to be sprayed into an environment, wherein said WDS is comprised of a fan and a water supply assembly, wherein said fan having a first blade and a second blade that rotate at various selectable speeds, wherein said first blades disperse water outward from said fan, and said second blades project air outward, wherein said water supply assembly having a reservoir that stores and supplies water which travels through a tube to at least one water dispersing head that is attached to said fan by attachment means, wherein water is directed outward from said water dispersing head onto the blades of said fan, wherein when the blades are rotating, as the water contacts the blades, the water is forcibly sprayed outward from said fan, into the environment, wherein said fan oscillates from right to left and left to right.

2. A water dispersing system (WDS) that allows a selectable quantity of water to be sprayed into an environment, wherein said WDS is comprised of a fan and a water supply assembly, wherein said fan having a first blade and a second blade that rotate at various selectable speeds, wherein said first blades disperse water outward from said fan, and said second blades project air outward, wherein said water supply assembly having a reservoir that stores and supplies water which travels through a tube to at least one water dispersing head that is attached to said fan by attachment means, wherein water is directed outward from said water dispersing head onto the blades of said fan, wherein when the blades are rotating, as the water contacts the blades, the water is forcibly sprayed outward from said fan, into the environment, wherein the attachment means for attaching said water dispersing head to said fan is comprised of a clip.

3. A water dispersing system (WDS) that allows a selectable quantity of water to be sprayed into an environment, wherein said WDS is comprised of a fan and a water supply assembly, wherein said fan having a first blade and a second blade that rotate at various selectable speeds, wherein said first blades disperse water outward from said fan, and said second blades project air outward, wherein said water supply assembly having a reservoir that stores and supplies water which travels through a tube to at least one water dispersing head that is attached to said fan by attachment means, wherein water is directed outward from said water dispersing head onto the blades of said fan, wherein when the blades are rotating, as the water contacts the blades, the water is forcibly sprayed outward from said fan, into the environment, wherein the attachment means for attaching said water dispersing head to said fan is comprised of a dispersing head attachment structure that is attached to a front surface of said fan and has a second connection interface that mates with a first connection interface on said water dispersing head, wherein when the two connection interfaces are mated, said water dispersing head is attached to said fan.

4. A water dispersing system (WDS) that allows a selectable quantity of water to be dispersed into an environment, wherein said WDS is comprised of:
   a) a fan comprising:
      1) a frame having an outer surface, an inner surface, a front perimeter edge, a rear perimeter edge, a front grill and a rear grill,
      2) a first plurality of blades that are connected via a shaft to a motor and are located within the frame between the front grill and the rear grill, wherein said first plurality of blades disperse water outward from said fan,
      3) a second plurality of blades that are connected via a shaft to, and are located in front of and adjacent to said first plurality of blades, wherein said second plurality of blades disperse air outward from said fan,
      4) a power switch for turning Said fan on and off, and a control knob and
      5) a standing extending downward from said fan and having a base, a vertical tube with an upper end and a lower end, and power cord,
   b) a water supply assembly comprising:
      1) a reservoir having an opening with a cap, a handle, and a water outlet,
      2) a reservoir support having a platform with an upper surface, a lower surface, a front edge and a rear edge; a vertical member extending downward from the platform and having an upper end and a lower end; a horizontal member extending from the vertical member and having a front end and a rear end; and attachment means for attaching said platform to said vertical member said vertical member to said horizontal member, and said horizontal member to said vertical tube on said stand,
      3) a water tube having a first end and a second end. wherein the first end is attached to the opening on said reservoir,
      4) a water spray head having a valve with a first end, a second end, a control knob and an opening; a brush that is inserted into the opening on said valve; and a first connection interface; wherein said water dispersing head is located on the second end of said water tube,
      5) a dispersing head attachment structure with a center section from where extends an upward-angled upper arm having an opening and a connection second interface, and a vertical arm that extends downward from said center section, wherein said dispersing head attachment structure is attached by attachment means to the front grill of said fan, wherein the first connection interface mates with the second connection interface to connect said water dispersing head to said dispersing head attachment structure, and
      6) an excess water basin having a front surface and a rear surface, wherein said basin is located below said fan, with a lower section of said fan placed within a cradle opening between the front surface and rear surface of said basin, wherein the vertical arm of said dispersing head attachment structure extends upward from the front surface of said basin, and a rear section extends upward from the rear surface, thereby maintaining said basin position below said fan, wherein water from said reservoir is gravity fed through said water tube, and exits from said water dispersing head, wherein the water from said water dispersing head passes through said valve and the brush which regulates the amount of water and directs the water onto said fan's blades, wherein once the water hits the spinning blades, the water is re-directed back out through the front grill of said fan, into the environment.

5. The WDS as specified in claim 4 wherein said fan is comprised of a table-top fan.

6. The WDS as specified in claim 4 wherein said fan is comprised of a floor-standing fan.

7. The WDS as specified in claim 4 wherein said fan oscillates from right to left and left to right.

8. The WDS as specified in claim 4 wherein said fan is made of plastic.

9. The WDS as specified in claim 4 wherein said fan is made of metal.

10. The WDS as specified in claim 4 wherein the control knob on said fan controls the selectable speeds at which said fan's blades rotate, wherein as said fan's blades increases in rotational speed, the water sprayed from said WDS increases speed and rate.

11. The WDS as specified in claim 4 wherein the attachment means for attaching said water dispersing head to said fan is comprised of a clip.

12. The WDS as specified in claim 4 wherein said excess water basin functions to collect any water that drips downward from said fan after being sprayed onto said fan's blades.

13. The WDS as specified in claim 4 wherein said WDS further comprises an excess water container with an upper surface including a cap having an opening, and a water tube, wherein said excess water container is located on said base and is maintained in position on said base by a container securement structure that is attached to said fan's frame vertical tube by a frame tube interface, wherein the water tube extends from a lower surface of said excess water basin to said excess water container, and said tube is inserted through the opening on the cap, wherein said excess water container accepts water from said basin, thereby providing a container that collects excess water from said basin and facilitates the emptying of the water after removing the cap.

14. The WDS as specified in claim 4 wherein said WDS further comprises a reservoir support rod with an upper end and a lower end, wherein said support rod functions as a reservoir support and extends upward from said base to said reservoir platform, wherein said support rod is maintained in a vertical position by inserting said rod's lower end into an opening on a rod attachment sleeve that extends from said base and is secured to said fan's frame vertical tube, wherein said attachment sleeve is angled to allow said support rod to extend upward and terminates at the substantial center of said platform where said support rod is attached to said platform, thereby supporting said reservoir.

15. The WDS as specified in claim 4 wherein said WDS further comprises ice that is added to the water in said reservoir to lower the temperature of the water that is sprayed outward from said WDS.

* * * * *